(12) United States Patent
Bergman (10) Patent No.: US 10,069,866 B2
(45) Date of Patent: *Sep. 4, 2018

(54) DYNAMIC SECURE PACKET BLOCK SIZING

(71) Applicant: Fastly, Inc., San Francisco, CA (US)

(72) Inventor: Artur Bergman, San Francisco, CA (US)

(73) Assignee: Fastly Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/687,733

(22) Filed: Aug. 28, 2017

(65) Prior Publication Data

US 2017/0353493 A1    Dec. 7, 2017

Related U.S. Application Data

(63) Continuation of application No. 15/180,283, filed on Jun. 13, 2016, now Pat. No. 9,774,629, which is a continuation of application No. 14/345,110, filed on Mar. 14, 2014, now Pat. No. 9,369,487.

(60) Provisional application No. 61/767,554, filed on Feb. 21, 2013.

(51) Int. Cl.
| | |
|---|---|
| *H04L 29/08* | (2006.01) |
| *H04L 29/06* | (2006.01) |
| *H04L 12/823* | (2013.01) |
| *H04L 29/12* | (2006.01) |
| *G06F 21/10* | (2013.01) |

(52) U.S. Cl.
CPC ............ *H04L 63/166* (2013.01); *G06F 21/10* (2013.01); *H04L 47/323* (2013.01); *H04L 61/6063* (2013.01); *H04L 63/02* (2013.01); *H04L 63/04* (2013.01); *H04L 63/0428* (2013.01); *H04L 63/0485* (2013.01); *H04L 63/168* (2013.01); *H04L 67/2842* (2013.01); *H04L 69/02* (2013.01); *H04L 69/166* (2013.01)

(58) Field of Classification Search
None
See application file for complete search history.

(56) References Cited

U.S. PATENT DOCUMENTS

| | | |
|---|---|---|
| 6,898,713 B1 | 5/2005 | Joly et al. |
| 2002/0035681 A1 | 3/2002 | Maturana et al. |
| 2003/0014624 A1 | 1/2003 | Maturana et al. |
| 2003/0014625 A1 | 1/2003 | Freed et al. |
| 2007/0050620 A1 | 3/2007 | Pham et al. |
| 2007/0266233 A1 | 11/2007 | Jethanandani et al. |
| 2007/0280111 A1 | 12/2007 | Lund |
| 2008/0049632 A1 | 2/2008 | Ray et al. |

(Continued)

OTHER PUBLICATIONS

Grigorik, Ilya. "High Performance Browser Networking." Feb. 1, 2013.

*Primary Examiner* — Michael R Vaughan (57) ABSTRACT

Disclosed herein are methods, systems, and software for handling secure transport of data between end users and content serving devices. In one example, a method of operating a content server includes identifying a content request from an end user device. The method further includes, responsive to the user request, determining a transmission control protocol window size and a secure layer protocol block size. The method also provides scaling the secure layer protocol block size to match the transmission control protocol window size, and transferring secure layer protocol packets to the end user device using the scaled secure layer protocol block size.

18 Claims, 4 Drawing Sheets

(56) References Cited

U.S. PATENT DOCUMENTS

| | | |
|---|---|---|
| 2008/0075000 A1 | 3/2008 | Robbins |
| 2009/0067367 A1 | 3/2009 | Buracchini et al. |
| 2011/0075845 A1 | 3/2011 | Calcev et al. |
| 2012/0079060 A1 | 3/2012 | Vijayakumar et al. |
| 2013/0139155 A1 | 5/2013 | Shah |
| 2016/0014152 A1 | 1/2016 | Buruganahalli et al. |

DYNAMIC SECURE PACKET BLOCK SIZING

RELATED APPLICATIONS

This application is a continuation of, and claims the benefit of priority to, U.S. application Ser. No. 15/180,283, filed on Jun. 13, 2016, entitled "DYNAMIC SECURE PACKET BLOCK SIZING," which itself claims priority to U.S. application Ser. No. 14/345,110, filed on Mar. 14, 2014, entitled "DYNAMIC SECURE PACKET' BLOCK SIZING," and granted as U.S. Pat. No. 9,369,487 on Jun. 14, 2016, and claims priority to U.S. Provisional Patent Application 61/767,554, filed on Feb. 21, 2013, and entitled "DYNAMIC SECURE PACKET BLOCK SIZING", all of which are hereby incorporated by reference in their entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include hosting servers which host network content of content creators or originators, such as web servers for hosting a news website.

To ensure secure transfer of content between end users and hosting systems, such as web servers, various secure transport protocols have been developed. In some examples, such as secure sockets layer (SSL) or transport layer security (TLS), a handshaking process occurs to exchange various parameters for the secure layer activities as well as to negotiate encryption keys and other security information. SSL/TLS protocols typically reside at the application layer of the Open Systems Interconnection (OSI) network layer model and can provide secure transfer of user data between endpoints. Other protocols, such as transmission control protocol (TCP) reside at the transport layer which handles flow control and data transport services for the application layer among other higher network layers.

OVERVIEW

Methods, systems, and software for handling secure transport of data between end users and content servers are presented. In one example, a method of operating a content delivery node includes determining a transmission control protocol window size and a secure layer protocol block size. The method further provides scaling the secure layer protocol block size to match the transmission control protocol window size, and transferring secure layer protocol packets using the scaled secure layer protocol block size.

In another instance, a method of operating a content server includes identifying a content request from an end user device. The method further includes, responsive to the user request, determining a transmission control protocol window size and a secure layer protocol block size. The method also provides scaling the secure layer protocol block size to match the transmission control protocol window size, and transferring secure layer protocol packets to the end user device using the scaled secure layer protocol block size.

In a further example, a computer apparatus to operate a content delivery node includes processing instructions that direct the content delivery node to determine a transmission control protocol window size and a secure layer protocol block size. The instructions further direct the content delivery node to scale the secure layer protocol block size to match the transmission control protocol window size, and transfer secure layer protocol packets using the scaled secure layer protocol block size. The computer apparatus further provides one or more non-transitory computer readable media that store the processing instructions.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Network content, such as web page content, typically includes content such as text, hypertext markup language (HTML) pages, pictures, video, audio, animations, code, scripts, or other content viewable by an end user in a browser or other application. This various network content can be stored and served by origin servers and equipment. The network content includes example website content referenced in FIG. 3, such as "www.gamma.gov," "www.alpha.com," and "www.beta.net," among others. In some examples, origin servers can serve the content to end user devices. However, when a content delivery system is employed, the content delivery system can act as a proxy to cache content delivery between origin servers and the end user devices.

Content delivery systems can add a layer of caching between origin servers of the content providers and the end users. The content delivery systems typically have one or more content delivery nodes distributed across a large geographic region to provide faster and lower latency local access to the content for the end users. When end users request content, such as a web page, a locally proximate content delivery node (CDN) will respond to the content request instead of the associated origin server. Various techniques can be employed to ensure the content delivery node responds to content requests instead of the origin servers, such as associating web content of the origin servers with network addresses of the content delivery nodes, instead of network addresses of the origin servers using domain name system (DNS) registration and lookup procedures.

In many examples of a CDN, multiple network content sources are handled by a single CDN. For example, a CDN can be configured to cache website content of many different websites of many different website content originators. When many different end users request content at the same time or over a similar time period, a CDN can become overloaded and have a slow response for content requests. Also, when the content requests include requests for securely transferred content, such as over secure sockets layer (SSL) or transport layer security (TLS) protocols, further packets and processing are typically required to establish secure communication links for the requested content. Discussed herein are many examples, which describe enhanced handling of SSL/TLS packets and data transfer under SSL/TLS protocols.

In one example, a content delivery node or other serving device is configured to provide content to end user devices. To accomplish this task, the serving device is configured to identify content requests from the user devices. Once the requests are identified, the serving device may determine a transmission control protocol window size and a secure layer protocol block size. This secure layer protocol may comprise SSL or TLS depending on the configuration of the serving device. Upon determination of the window size and block size, the serving device is configured to scale the block size to match the transmission control protocol window size, and transfer secure layer protocol packets using the scaled block size.

Figure 1:
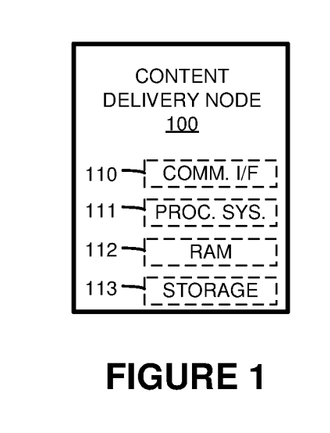
FIG. 1 is a block diagram illustrating a content delivery node.

Turning now to FIG. 1, FIG. 1 illustrates content delivery node (CDN) 100. CDN 100 includes communication interface 110, processing system 111, random access memory (RAM) 112, and storage 113.

In operation, processing system 111 is operatively linked to communication interface 110, RAM 112, and storage 113. Processing system 111 is capable of executing software stored in RAM 112 or storage 113. When executing the software, processing system 111 drives CDN 100 to operate as described herein. CDN 100 can also include other elements, such as user interfaces, computer systems, databases, distributed storage and processing elements, and the like.

Processing system 111 can be implemented within a single processing device, but can also be distributed across multiple processing devices or sub-systems that cooperate in executing program instructions. Examples of processing system 111 include general purpose central processing units, microprocessors, application specific processors, and logic devices, as well as any other type of processing device.

Communication interface 110 includes one or more network interfaces for communicating over communication networks, such as packet networks, the Internet, and the like. The network interfaces can include one or more local or wide area network communication interfaces, which can communicate over Ethernet or Internet protocol (IP) links. Examples of communication interface 110 include network interface card equipment, transceivers, modems, and other communication circuitry.

RAM 112 and storage 113 together can comprise a data storage system. RAM 112 and storage 113 can each comprise any storage media readable by processing system 111 and capable of storing software. RAM 112 can include volatile and nonvolatile, removable and non-removable media, implemented in any method or technology for storage of information, such as computer readable instructions, data structures, program modules, or other data. Storage 113 can include non-volatile storage media, such as solid state storage media or flash memory. RAM 112 and storage 113 can each be implemented as a single storage device, but can also be implemented across multiple storage devices or sub-systems. RAM 112 and storage 113 can each comprise additional elements, such as controllers, capable of communicating with processing system 111. In some implementations, the storage media can be a non-transitory storage media. In some implementations, at least a portion of the storage media can be transitory. It should be understood that in no case are the storage media propagated signals.

Software stored on or in RAM 112 or storage 113 can comprise computer program instructions, firmware, or some other form of machine-readable processing instructions having processes that when executed by processing system 111 direct CDN 100 to operate as described herein. For example, software drives CDN 100 to receive requests for content, determine if the content is stored in CDN 100, retrieve content from origin servers, transfer content to end user devices, manage data storage systems for handling and storing the content, and establish secure communications over SSL/TLS or other secure protocols, modify window or block sizes of SSL/TLS transfers, among other operations. The software can also include user software applications. The software can be implemented as a single application or as multiple applications. In general, the software can, when loaded into processing system 111 and executed, transform processing system 111 from a general-purpose device into a special-purpose device customized as described herein.

Figure 2:
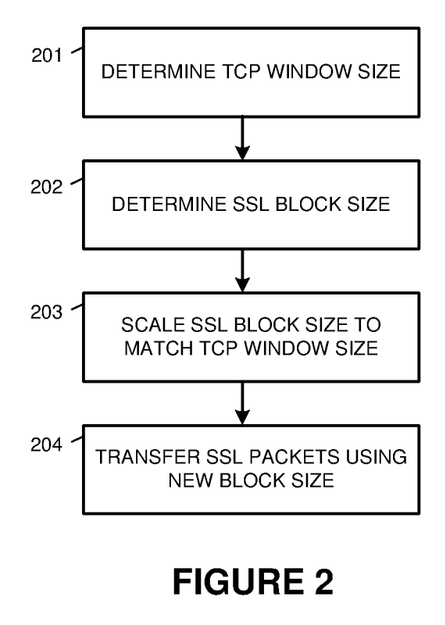
FIG. 2 is a flow diagram illustrating a method of operation of a content delivery node.

FIG. 2 illustrates a flow diagram that describes an example of operation of a content delivery node, such as for CDN 100 of FIG. 1. The operations of FIG. 2 are referenced parenthetically in the description below. Although the SSL protocol is discussed in FIG. 2, it should be understood that the operations might instead describe the operation of TLS-based data transfers.

In FIG. 2, CDN 100 determines (201) a transmission control protocol (TCP) window size. The TCP window size can be identified for a present transaction with a particular end user, or can be a global TCP window size for an operating system of CDN 100 or network software driver of CDN 100, among other TCP window size configurations. In some examples, the TCP window size is dynamic and varies from time to time. The TCP window size is typically indicated in bytes, and relates to the amount of data transferred using the TCP protocol before an acknowledge (ACK) packet is required. For example, if the TCP window size is 20 kilobytes (KB), CDN 100 will transfer 20 KB of data for receipt by an end user, and will await an ACK packet from the end user before sending further data. In this manner, TCP enables flow control between two endpoints, allowing for a certain amount of data transfer before an acknowledgement from an end user device.

CDN 100 determines (202) an SSL block size. The SSL block size can be a size of granular SSL data pieces used in secure transfer of data to an end user. For example, to send data of a first size, CDN 100 may break that data into smaller pieces of a second size according to the block size of the SSL transfer employed. As a further example, if 200 KB of data are to be transferred, and the SSL block size is 19 KB, then 11 data pieces are transferred using the SSL protocol.

CDN 100 scales (203) the SSL block size to match TCP window size. In some cases, the SSL block size will be of a different or mismatched size than the TCP window size. In such mismatched cases when data is transferred using SSL, a portion of the data transferred using SSL may have a mismatch with the TCP window size. Accordingly, CDN

100 may not receive an ACK packet or may receive a delayed ACK packet from the end user when the TCP window size is not met for a particular transfer portion. However, CDN 100 scales the SSL block size to match the TCP window size in the present example. Thus, data transfer using SSL ends on a window size boundary for TCP, and an ACK packet is received or received more quickly than the mismatched sizing case. Once the matching is complete for the window size and block size, CDN 100 transfers (204) SSL packets using the new block size.

To scale the SSL block size various techniques can be employed. In a first example, padding can be employed in SSL data packets to ensure data transfers using SSL are sized according to the TCP window size. In other examples, a new SSL block size is set via a parameter in an application level service or application level software, and any data transferred using the SSL protocol by the associated application is subsequently transferred using the new SSL block size.

An operating system or low-level network driver typically handles TCP, and in some examples it can be more difficult to adjust a TCP window size. In other examples, the TCP window size is dynamic and constantly adjusting to traffic conditions or other data transfer considerations. The SSL block size is typically handled at the application layer, and thus adjustable by an application level service to match the lower-level TCP window size.

Although illustrated as an operation for a content delivery node, it should be understood that the operation described in FIG. 2 might be implemented in any content server. For instance, the operation may be implemented in an origin serving computer, a desktop computer, or any other content serving device.

Figure 3:
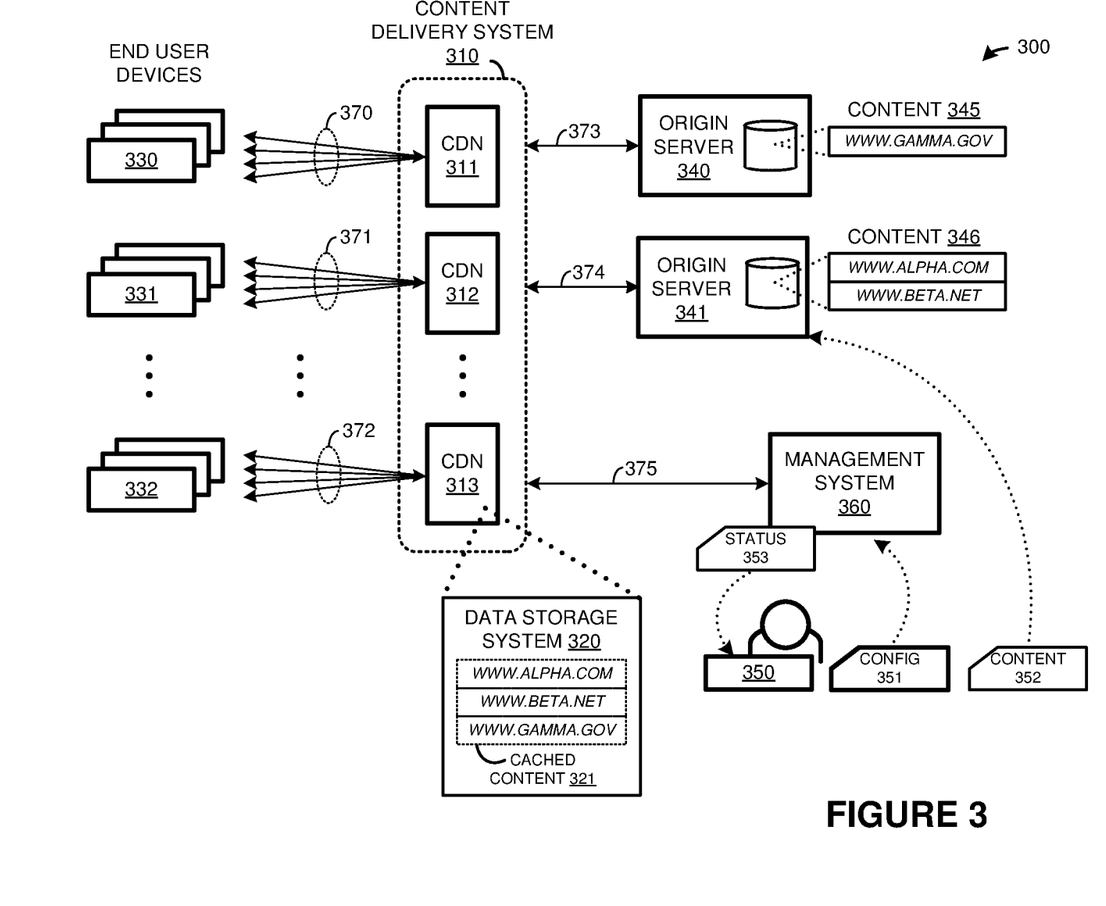
FIG. 3 is a system diagram illustrating a communication system.

As an example employing multiple content delivery nodes in a content delivery system, FIG. 3 is presented. FIG. 3 can include one or more of CDN 100 of FIG. 1. FIG. 3 is a system diagram illustrating communication system 300. Communication system 300 includes content delivery system 310, end user devices 330-332, origin servers 340-341, and management system 360. Content delivery system 310 includes one or more content delivery nodes (CDN) 311-313. Each of CDN 311-313 can include one or more data storage systems, such as that illustrated for CDN 313 as data storage system 320. End user devices 330-332 are representative of a plurality of end user devices that can request and receive network content, and any number of end user devices 330-332 can be associated with each of content delivery nodes 311-313. CDN 311-313 and ones of end users 330-332 communicate over associated network links 370-372. Content delivery system 310 and origin servers 340-341 communicate over associated network links 373-374. Content delivery system 310 and management system 360 communicate over link 375. Although not shown in FIG. 3 for clarity, each of CDN 311-313 can also communicate with each other over network links.

To further illustrate FIG. 3, a brief description of the operation of communication system 300 is included. In operation, end user devices 330-332 request network content, such as content 345-346 associated with origin servers 340-341. Instead of these requests being handled by the individual origin servers 340-341, individual content delivery nodes 311-313 of content delivery system 310 receive the content requests over ones of links 370-372 and process the content requests for delivery of the content to the associated end user devices 330-332. Requested network content that is already stored in ones of CDN 311-313 can be provided quickly to the end user devices, while network content that is not already stored in ones of CDN 311-313 can be responsively requested by an associated one of CDN 311-313 from an appropriate origin server 340-341 for delivery by the CDN and possible caching by the CDN. in this manner, each of CDN 311-313 can act as intermediary proxy nodes to provide local and fast access for end user devices 330-332 to network content of origin servers 340-341 without burdening origin servers 340-341. FIG. 3 shows cached content 321 included in data storage system 320 of CDN 313 as comprised of content 345-346, and thus content 345-346 is currently shown as cached by CDN 313. Other configurations are possible, including subsets of content 345-346 being cached in individual ones of CDN 311-313.

Although FIG. 3 shows content 345-346 of origin servers 340-341 being cached by data storage system 320, CDN 311-313 can handle other content. For example, dynamic content generated by activities of end user devices 330-332 need not originally reside on origin servers 340-341, and can be generated due to scripting or code included in web page content delivered by CDN 311-313. This dynamic content can also be cached by ones of CDN 311-313, and can be specific to a particular end user device during a communication session.

Management system 360 handles configuration changes and status information collection and delivery for system operators and for the origin server operators or managers. For example, operator device 350 can transfer configuration 351 for delivery to management system 360, where configuration 351 can alter the handling of network content requests by CDN 311-313, among other operations. Also, management system 360 can monitor status information for the operation of CDN 311-313, such as operational statistics, and provide this status information as 353 to operator device 350. Furthermore, operator device 350 can transfer content 352 for delivery to origin servers 340-341 to include in content 345-346. Although one operator device 350 is shown in FIG. 3, it should be understood that this is merely representative and communication system 300 can include many operator devices for receiving status information, providing configuration information, or transferring content to origin servers.

Referring back to the elements of FIG. 3, CDN 311-313, origin servers 340-341, and management system 360 can each include communication interfaces, network interfaces, processing systems, computer systems, microprocessors, storage systems, storage media, or some other processing devices or software systems, and can be distributed among multiple devices. Examples of CDN 311-313, origin servers 340-341, and management system 360 can each include software such as an operating system, logs, databases, utilities, drivers, caching software, networking software, and other software stored on a computer-readable medium. Content delivery system 310, in addition to including CDN 311-313, can include equipment and links to route communications between CDN 311-313 and any of end user devices 330-332, origin servers 340-341, and management system 360, among other operations.

End user devices 330-332 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 370-375 each use metal, glass, optical, air, space, or some other material as the transport media. Communication links 370-375 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 370-375 can each be a direct link or can include intermediate networks, systems, or devices, and can include a logical network link transported over multiple physical links. Although one main link for each of links 370-375 is shown in FIG. 3, it should be understood that links 370-375 are merely illustrative to show communication modes or access pathways. In other examples, further links can be shown, with portions of the further links shared and used for different communication sessions or different content types, among other configurations. Communication links 370-375 can each include many different signals sharing the same associated link, as represented by the associated lines in FIG. 3, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 4:
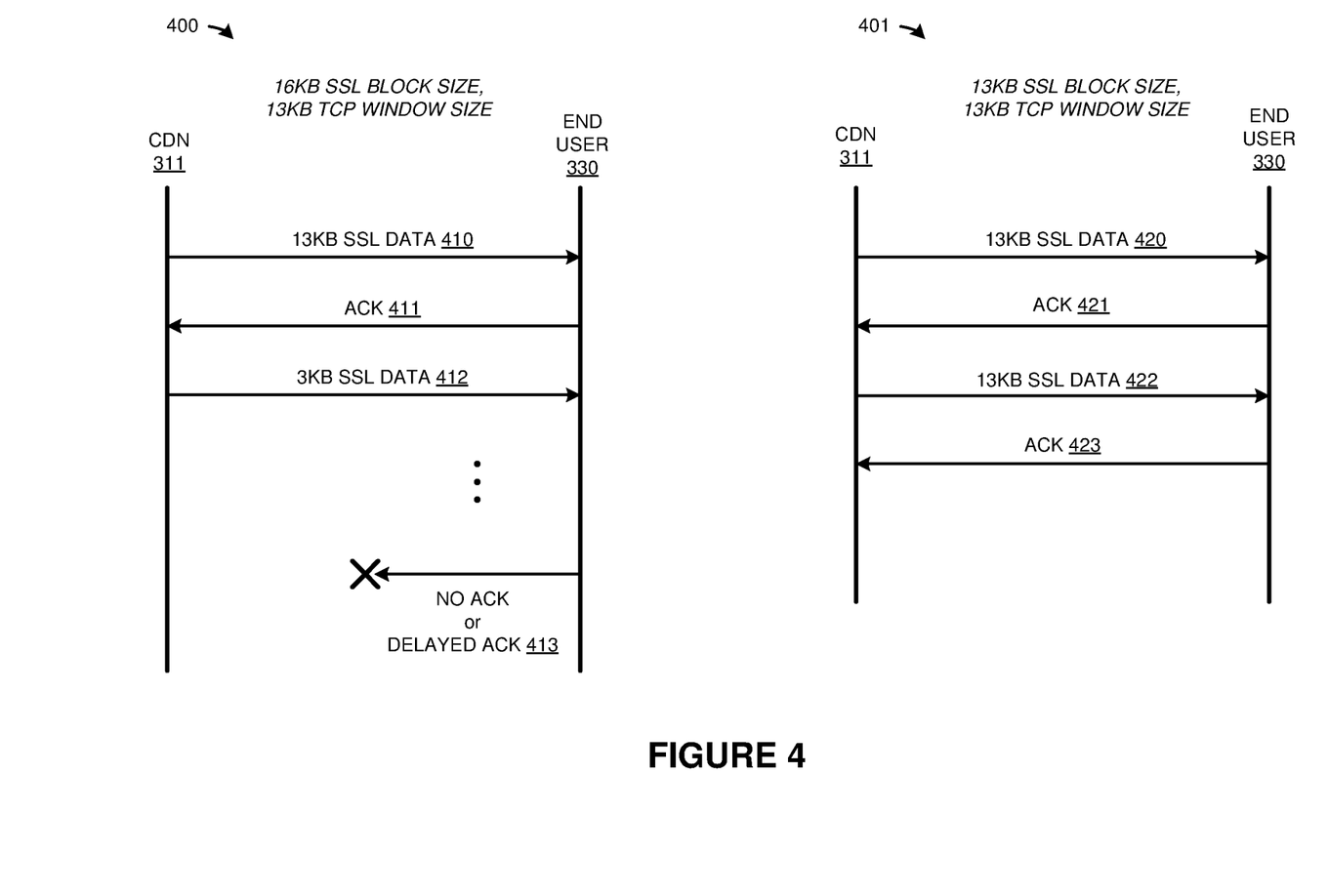
FIG. 4 includes sequence diagrams illustrating data transfer.

FIG. 4 includes sequence diagrams 400 and 401 illustrating data transfer between CDN 311 and end user 330. However, FIG. 4 can illustrate operations for CDN 100 of FIG. 1, CDN 311-313 of FIG. 3, or other similar content serving devices. In diagram 400, a 'mismatched' SSL, and TCP scenario is shown. In diagram 401, a 'matched' SSL and TCP scenario is shown. Although the SSL protocol is discussed in FIG. 4, it should be understood that the operations can describe the operation of other secure layer protocols, such as TLS-based data transfers.

In diagram 400, a 13 kilobyte (KB) TCP window is employed, and a 16 KB SSL block size is employed. A single 16 KB data transfer using the SSL protocol is shown. During a first SSL transfer 410, CDN 311 transfers a 13 KB data portion (according to the TCP window size) to end user 330. In response to the 13 KB data portion, end user 330 is configured to transfer acknowledgement (ACK) packet 411 to CDN 311. Once ACK packet 411 is received by CDN 311, CDN 311 can transfer the remaining portion 412 of the SSL block for delivery to end user 330. Since only 3 KB remains in the 16 KB SSL block, this 3 KB is transferred as the remaining portion. However, since the 3 KB portion 412 is less than the TCP window size, end user 330 may not transfer ACK packet 413 responsive to this 3 KB data block, or may wait for a timeout period to transfer ACK packet 413 for delivery to CDN 311. As a result, delays can occur due to this mismatch.

In contrast to diagram 400, diagram 401 illustrates a 13 KB TCP window with a 13 KB SSL block size. The SSL block size has been scaled to match the 13 KB TCP window size. During a first SSL transfer 420, CDN 311 transfers a 13 KB data portion (according to the TCP window size) for delivery to end user 330. In response to the 13 KB data portion, end user 330 is configured to transfer acknowledgement (ACK) packet 421. Once CDN 311 receives ACK packet 421, CDN 311 can transfer further data immediately. Thus, CDN 311 transfers second SSL transfer 422, and responsively receives ACK packet 423. Fewer delays result from this matching of window and block sizes.

Although in the examples herein, a matching of a SSL block size to a TCP window size is discussed, other sizes can be employed. For example, the SSL block size can be scaled to be a multiple of the TCP window size, so that if a TCP window size is indicated by 'n' size, then the SSL window size can be any integer multiple of 'n'—such as 1n, 2n, 3n, and the like.

Figure 5:
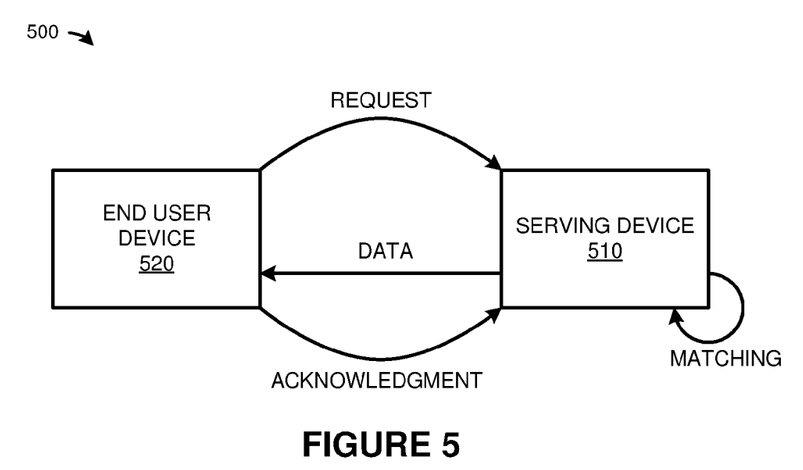
FIG. 5 is a block diagram illustrating a secure data transfer between a content server and an end user device.

Although illustrated in the previous examples using content delivery nodes, it should be understood that the methods of implementing the secure data transfers might apply to any content serving device, such as an origin server. To further illustrate the alternative examples, FIG. 5 is included. FIG. 5 illustrates a block diagram 500 that includes serving device 510 and end user device 520.

In operation, end user device 520 is configured to pass content requests to serving device 510. These content requests may identify a variety of different data, but may also identify a request to maintain a secure communication. To accomplish this secure communication, serving device 510 is configured to determine a transmission control protocol window size as well as a secure layer protocol block size. This secure layer protocol may include SSL or TLS in some examples depending on the configuration of serving device 510. Once the window size and the block size are identified, serving device 510 is configured to scale the secure layer protocol block size to match the transmission control protocol window size.

To scale the secure layer protocol block size various techniques may be employed by content server 510. In a first example, padding can be employed in the secure layer protocol data packets to ensure data transfers using the secure layer protocol are sized according to the TCP window size. As a result, empty data packets may be included to "pad" or otherwise ensure that the block size matches the window size. In other examples, a new secure layer protocol block size is set via a parameter in an application level service or application level software, and any data transferred using the secure layer protocol by the associated application is subsequently transferred using the new secure layer protocol block size.

Once the block size is matched to the window size, serving device 510 is configured to pass data to end user device 520 using the secure layer protocol. Accordingly, end user device 520 is configured to return acknowledgments to serving device 510 upon receipt of each of the scaled blocks from serving device 510. For example, if the window size and block size were set to 10 KB, the user device would be configured to return an acknowledgment for every 10 KB delivered using the secure layer protocol.

Figure 6:
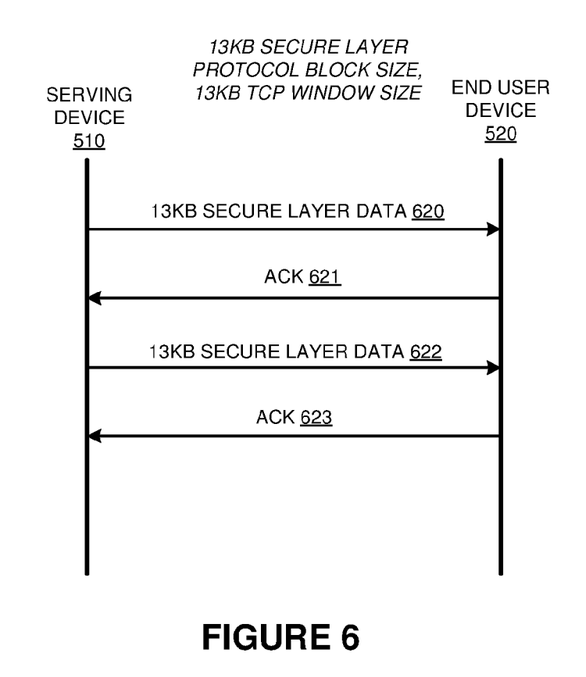
FIG. 6 is a sequence diagram illustrating data transfer between a content server and an end user device.

As an illustrative example of implementing scaling on a content server to match the secure layer protocol block size and the transmission control protocol window size, FIG. 6 is included. FIG. 6 illustrates the transmission of data between serving device 510 and end user device 520. As depicted, end user device 520 has requested data from serving device 510. In response to this content request, serving device 510 is configured to match the secure layer protocol block size with the TCP window size, which in the present example is 13 KB. Once the block size and the window size have been matched, serving device 510 is configured to initiate a transfer 620 and 622 of secure layer data in 13 KB data segments or packets to end user device 520. Responsive to the data, end user device 520 is configured to transfer an acknowledgement 621 and 623 for every 13 KB received from the serving device. By matching the window size and the secure layer protocol block size, the serving device may more readily predict the timing for acknowledgements and limit the number of delays from missing acknowledgments.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein can be in the form of a functional diagram, operational sequence, or flow diagram, and can be described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology can be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above.

What is claimed is:

1. A method of operating a computing system comprising:
   receiving a request for content from a second computing system;
   identifying a transmission control protocol window size employed by the second computing system to transact the content for the request;
   matching a secure layer protocol block size and the transmission control protocol window size if the transmission control protocol window size is different than the secure layer protocol block size; and
   in reply to the request, transferring secure layer protocol packets to the second computing system using the matched secure layer protocol block size and transmission control protocol window.

2. The method of claim 1 wherein matching the secure layer protocol block size and the transmission control protocol window size comprises padding the secure layer protocol block size to match the transmission control protocol window size.

3. The method of claim 2 wherein padding the secure socket layer block size comprises adding empty secure layer protocol data to match the transmission control protocol window size.

4. The method of claim 1 wherein matching the secure layer protocol block size and the transmission control protocol window size comprises setting the scaled secure layer protocol block size via one or more parameters in an application layer service on the computing system.

5. The method of claim 1 wherein matching the secure layer protocol block size and the transmission control protocol window size comprises setting the scaled secure layer protocol block size via one or more parameters in application level software.

6. The method of claim 1 wherein the secure layer protocol comprises one of secure sockets layer or transport layer security.

7. A computing system comprising:
   one or more non-transitory storage media;
   a processing system operatively coupled with the one or more non-transitory storage media; and
   program instructions stored on the one or more non-transitory storage media that, when executed by the processing system, direct the processing system to at least:
   receive a request for content from a second computing system;
   identify a transmission control protocol window size employed by the second computing system to transact the content for the request;
   match a secure layer protocol block size and the transmission control protocol window size if the transmission control protocol window size is different than the secure layer protocol block size; and
   in reply to the request, transfer secure layer protocol packets to the second computing system using the matched secure layer protocol block size and transmission control protocol window.

8. The computing apparatus of claim 7 wherein to match the secure layer protocol block size to the transmission control protocol window size, the processing system pads the secure layer protocol block size to match the transmission control protocol window size.

9. The computing apparatus of claim 8 wherein to pad the secure socket layer block size, the processing system adds empty secure layer protocol data to match the transmission control protocol window size.

10. The computing apparatus of claim 7 wherein to match the secure layer protocol block size to the transmission control protocol window size, the processing system sets the scaled secure layer protocol block size via one or more parameters in an application layer service on the cache node.

11. The computing apparatus of claim 7 wherein to match the secure layer protocol block size to the transmission control protocol window size, the processing system sets the scaled secure layer protocol block size via one or more parameters in application level software.

12. The computing apparatus of claim 7 wherein the secure layer protocol comprises one of secure sockets layer or transport layer security.

13. An apparatus comprising:
   one or more non-transitory storage media;
   program instructions stored on the one or more non-transitory storage media that, when executed by the processing system, direct the processing system to at least:
   receive a request for content from a second computing system;
   identify a transmission control protocol window size employed by the second computing system to transact the content for the request;
   match a secure layer protocol block size and the transmission control protocol window size if the transmission control protocol window size is different than the secure layer protocol block size; and
   in reply to the request, transfer secure layer protocol packets to the second computing system using the matched secure layer protocol block size and transmission control protocol window.

14. The apparatus of claim 13 wherein to match the secure layer protocol block size to the transmission control protocol windows size, the processing system pads the secure layer protocol block size to match the transmission control protocol window size.

15. The apparatus of claim 14 wherein to pad the secure socket layer block size, the processing system adds empty secure layer protocol data to match the transmission control protocol window size.

16. The apparatus of claim 13 wherein to match the secure layer protocol block size to the transmission control protocol window size, the processing system sets the scaled secure layer protocol block size via one or more parameters in an application layer service on the cache node.

17. The apparatus of claim 13 wherein to match the secure layer protocol block size to the transmission control protocol window size, the processing system sets the scaled secure layer protocol block size via one or more parameters in application level software.

18. The apparatus of claim 13 wherein the secure layer protocol comprises one of secure sockets layer or transport layer security.

\* \* \* \* \*